United States Patent [19]

Kemper et al.

[11] 4,117,736
[45] Oct. 3, 1978

[54] VARIABLE STROKE EXPANSIBLE ENERGY CONVERSION MACHINE HAVING STATIC CONTROL MEANS

[75] Inventors: Yves Jean Kemper, Birmingham, Mich.; Harvey N. Pouliot, Livermore, Calif.

[73] Assignee: Vadetec Corporation, Troy, Mich.

[21] Appl. No.: 760,693

[22] Filed: Jan. 19, 1977

[51] Int. Cl.² ............................................. F16H 23/00
[52] U.S. Cl. ........................................ 74/60; 417/222
[58] Field of Search ............... 74/60; 417/222; 91/504, 91/506

[56] References Cited

U.S. PATENT DOCUMENTS

| | | | |
|---|---|---|---|
| 1,204,892 | 11/1916 | Macomber | 74/60 |
| 1,255,973 | 2/1918 | Almen | 74/60 |
| 2,048,272 | 7/1936 | Linthicum | 74/60 |
| 3,093,081 | 6/1963 | Budzich | 417/222 |
| 3,319,874 | 5/1967 | Welsh et al. | 74/60 |

*Primary Examiner*—Benjamin W. Wyche
*Assistant Examiner*—Wesley S. Ratliff, Jr.
*Attorney, Agent, or Firm*—Lane, Aitken, Dunner & Ziems

[57] ABSTRACT

An expansible chamber energy conversion machine having a frame, a torque transmitting member supported by the frame for rotation about a first axis, a nutatable member having journal surfaces concentric with a second axis intersecting the first axis at an angle to establish a point of axes intersection, support means rotatable on the first axis and rotatably supporting the nutatable member for movement of the second axis in a biconical path about the first axis with the apex of the biconical path coincident with the point of axes intersection, one or more pistons reciprocable through a stroke distance in working fluid chambers having end faces fixed relative to the frame and adjustable linkage assemblies for connecting the pistons with the nutating member. The nutatable member is supported by the support means by way of a journal member arranged to change the angle of first and second axes intersection upon axial movement of the journal member relative to the support member. Static control means is provided for adjustably positioning the fulcrum point of a double-ended swivel link in a manner to shift the nutating member axially and thus change the nutational throw of the nutatable member in a manner to vary the stroke distance of piston reciprocation and maintain proper compression ratio. The nutatable member is driven by the pistons in a manner to convert piston reciprocation to rotary movement of the torque transmitting member.

14 Claims, 9 Drawing Figures

VARIABLE STROKE EXPANSIBLE ENERGY CONVERSION MACHINE HAVING STATIC CONTROL MEANS

BACKGROUND OF THE INVENTION

This invention relates to expansible chamber energy conversion machines and more particularly, it concerns a novel apparatus for varying the stroke of a reciprocable piston in such machines without substantial variation in the volumetric ratio of the expansible chamber defined in part by the piston.

Expansible chamber energy conversion machines typically include Otto or Diesel cycle internal combustion engines, heat engines in which fuel is burned externally, such as steam engines and Stirling engines, air motors, as well as machines which operate to transform mechanical energy to fluid and/or thermal energy, such as compressors and pumps. In all such machines, operating efficiency is optimized when the work performed in the expansible chamber is correlated with the load demand for converted energy. Where the energy conversion requirements are widely variable therefore, variation in the volumetric capacity of the expansible chamber is significant in the attainment of optimum efficiency under all operating conditions.

In a co-pending application for U.S. Pat. Ser. No. 738,704 filed Nov. 3, 1976 by Yves Jean Kemper and assigned to the assignee of the present invention, there is disclosed as embodiment of an internal combustion engine in which power developed by pistons reciprocating in cylindrical combustion chambers in transmitted to a nutating generally cylindrical member carried by an external rotary support member about an output shaft having a pair of oppositely convergent cone-like members to which torque is transmitted by friction from internal rolling surfaces on the cylindrical nutating member. The thrust of piston reciprocation is absorbed by double-ended swivel links each having one end universally pivotal about a fixed point of reference and the other end universally pivotal in a socket fixed at one end of the nutating cylindrical member. A feature of the illustrative embodiment disclosed is the provision of an eccentric sleeve means by which the angle of cylindrical member nutation may be varied in a manner to vary the length of piston stroke relative to a cylinder head either with or without a constant compression ratio.

In the engine disclosed in the aforementioned application, the frequency of piston reciprocation is directly proportional to the angular velocity of the support journaled to the exterior of the cylindrical nutating member. Output speed or angular velocity of the shaft to which the cone-like members are keyed is a function of the effective internal radius of the nutating cylindrical member and the radii of the cone-like members at the point of frictional engagement between these members. Output speed may be varied for a given engine speed by shifting a pair of ring-like members carried on the interior of the cylindrical nutating member axially of the cone-like members carried on the output shaft.

In another co-pending application for U.S. Pat. Ser. No. 743,600, filed Nov. 22, 1976 by Yves Jean Kemper and also commonly assigned with the present invention, there is disclosed a piston engine in which the output shaft speed of the engine is varied in inverse proportion to piston stroke length variation in response to an adjustable control function determinative of both piston stroke length and the ratio of engine speed to output shaft speed. This operating characteristic is achieved by a similar structural arrangement in which a pair of cone-like members, rotatably supported on a first axis, are driven by rolling friction engagement with cylindrical interior rolling surfaces of a nutatable member having a second axis inclined with respect to and intersecting the first axis midway between the cone-like members. The nutating member is also supported externally by a support member journaled for rotation about the first axis in direct proportion to engine speed or frequency of piston reciprocation but in the disclosure of this latter application, torque developed in the support member is transmitted as one of two inputs to an epicyclic gear train, the other of the two inputs being a direct connection with the cone-like members. These torque inputs are transmitted through the epicyclic gear train to a common engine output shaft.

Further in accordance with the disclosure of Ser. No. 743,600, variation in piston stroke length as well as speed variation of torque transmission to the cone-like members is effected by adjusting the angle of first and second axes intersection, again using an eccentric sleeve provided between the exterior of the nutating cylindrical member and the support member. In this instance, the cone-like members are designed with a long meridianal radius so that variation in the angle of first and second axes intersection will shift the points of rolling friction contact between the interior of the nutating cylindrical member and the cone-like members along the axial length of the cone-like members and correspondingly, vary the effective radius of the cone-like members. As a result, engine speed, piston stroke and output shaft speed are correlated in a manner to optimize operating efficiency.

In the machines disclosed in both of the aforementioned co-pending applications, piston connection with the nutating member is by way of rigid arm-like extensions of the nutating member, the thrust of piston force being absorbed by double-ended swivel links or "dog bones", as they are sometimes referred to in the art, each having one end swivelled in the machine frame at a fixed fulcrum point and the other end swivelled at the juncture of the arm-like extension and the nutating member. As a result of this construction, variation in the angle of intersection between the axis of the nutating member and the axis of the conical members results in an axial shifting of the nutating member, its support and the conical members, a feature which is required to maintain the various machine components in a balanced state of the equilibrium and also which is advantageously deployed to achieve variations in piston stroke length with a predictable variation in compression ratio where cylinder heads are fixed to the frame.

While the machines disclosed in the aforementioned co-pending patent applications represent a significant advance in the art, there is need for improvement principally from the standpoint of increasing the range of piston stroke variation in a given machine design. In addition, the achievement of adequate strength in the connection of the pistons to the nutating member using curved arm-like extensions presents problems both from the standpoint of manufacturing difficulty and likelihood of failure due to metal fatigue in operation over extended durations of time.

SUMMARY OF THE PRESENT INVENTION

In accordance with the present invention, a significantly improved piston-type energy conversion machine, represented for example by an internal combustion engine, is provided in which the range of piston stroke length determined by the inclination of a nutating member is maximized for a given variation in the angle of inclination of the nutating member with respect to the axis about which it nutates. In addition, control over piston stroke length as well as the locus of piston reciprocation relative to a fixed cylinder end face to account for compression ratio is effected by a single static control function which assures dynamic force balancing for all operational modes and which in addition resolves major force loading to frame components capable of absorbing them.

These characteristics, among others, are obtained by a machine or engine construction in which a torque transmitting member, carrying axially slidable cone-like members and supported by the engine frame for rotation about a first axis, extends through a cylindrical tube-like nutating member having concentric journal and rolling surfaces of revolution about a second axis inclined with respect to and intersecting the first axis at a point of axes intersection so that nutating motion of the tube-like member in a biconical path will transmit torque to the cone-like members by frictional engagement at two points of contact on opposite sides of the point of axes intersection. The journal surfaces of the nutating member are rotatably engaged by a journal member splined for combined axial and angular movement in a support rotatable in the frame about the first axis so that the angle of nutation will vary with axial movement of the journal member in the support.

One or more reciprocable pistons are connected with the tube-like nutating member, each by a linkage including a piston rod extending from the piston to a swivel joint with one end of a swivelling compression link, the other end of which is supported by a carriage member adjustably mounted on the frame. The connection of the compression link to the carriage member is effected by a compound fulcrum in which the link pivots about mutually perpendicular axes offset on a line intersecting one of such offset axes and the point of first and second axes intersection. This arrangement, coupled with reciprocation of the pistons, results in eliptical movement of the swivel joint, which in turn, is transmitted as nutating movement in the nutatable member by a spider also connected for universal pivotal movement at the swivel joint.

The carriage member by which one end of the compression link is mounted to the frame is adjustable with a component of direction parallel to the first axis so that a control force moving the socket will also move the nutatable tube and journal member axially to change the angle of first and second axes intersection. Because of the geometry of the linkage interconnecting the pistons with the nutating member, this change in the angle of first and second axes intersection will result also to change the major and minor diameters of the eliptical path followed by the swivel joint connection of the piston rod and swivel link, the length of piston stroke distance and the locus of piston reciprocation relative to an expansion chamber end face fixed relative to the frame. Where multiple pistons and correspondingly multiple linkages connecting the pistons to a common nutating member are employed in a machine incorporating the invention, each carriage member adjustably supporting one end of each swivel link in the frame is adjusted by a common control arranged so that the distance through which each swivel link supporting carriage member is moved will be identical. To prevent rotation of the nutating member about the second axis, one or more grounding homokinetic joints may extend between the nutating member connected spider and the frame.

Among the objects of the present invention are, therefore: the provision of an improved expansible chamber energy conversion machine capable of providing for a wide range of piston stroke length variation while maintaining essentially constant the volumetric ratio of maximum/minimum chamber volumes defined by the piston in relation to a fixed chamber end face; the provision of such an expansible chamber energy machine having particular application to piston-type internal combustion engines; the provision of such an expansible chamber energy conversion machine in which variation in piston stroke length is accommodated by a single static control; the provision of such a machine in which dynamic balance of operating components is optimized at maximum energy conversion; the provision of a variable stroke internal combustion engine operable at essentially constant but slightly variable compression ratios in which compression ratio increases as piston stroke distance decreases; the provision of such an engine in which the degree of dynamic balance increases to optimum at maximum piston stroke length; the provision of such a machine in which components are easily formed and assembled using conventional machining, die-casting and manufacturing techniques; and the provision of an internal combustion engine in which optimum operating efficiency is obtained by varying output speed in inverse proportion to engine displacement variation under a single static control.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
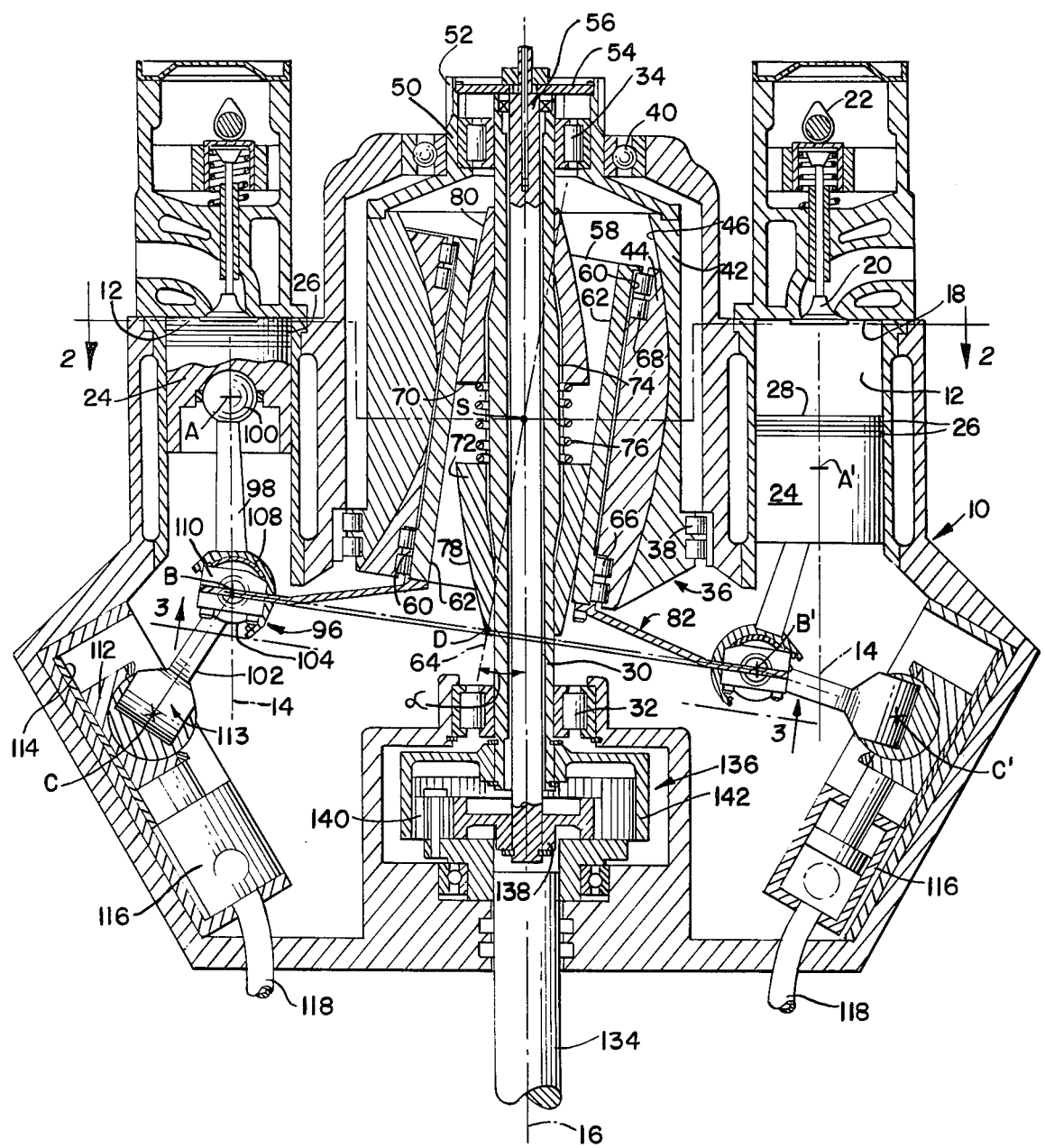
FIG. 1 is a longitudinal cross-section through an internal combustion engine incorporating the improvements of the present invention.
Figure 2:
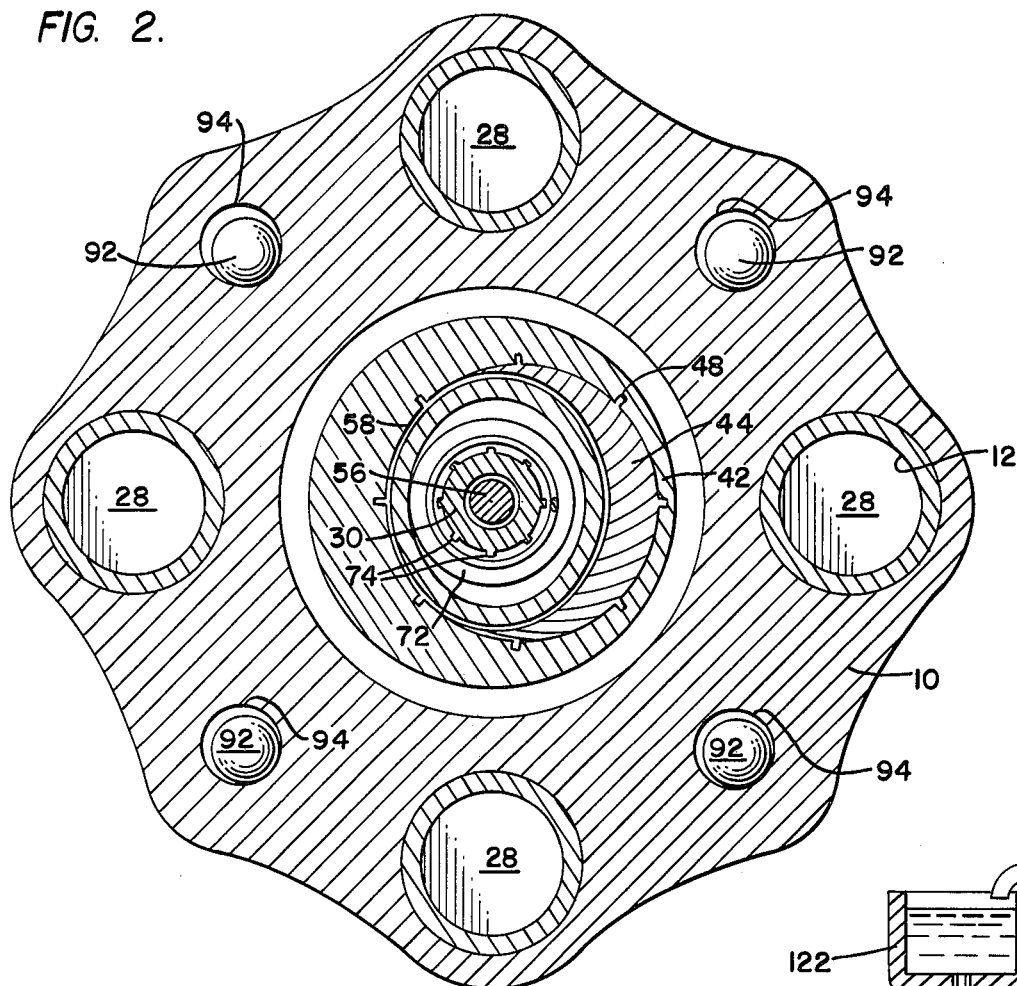
FIG. 2 is a fragmentary cross-section at a reduced scale on line 2—2 of FIG. 1.
Figure 3:
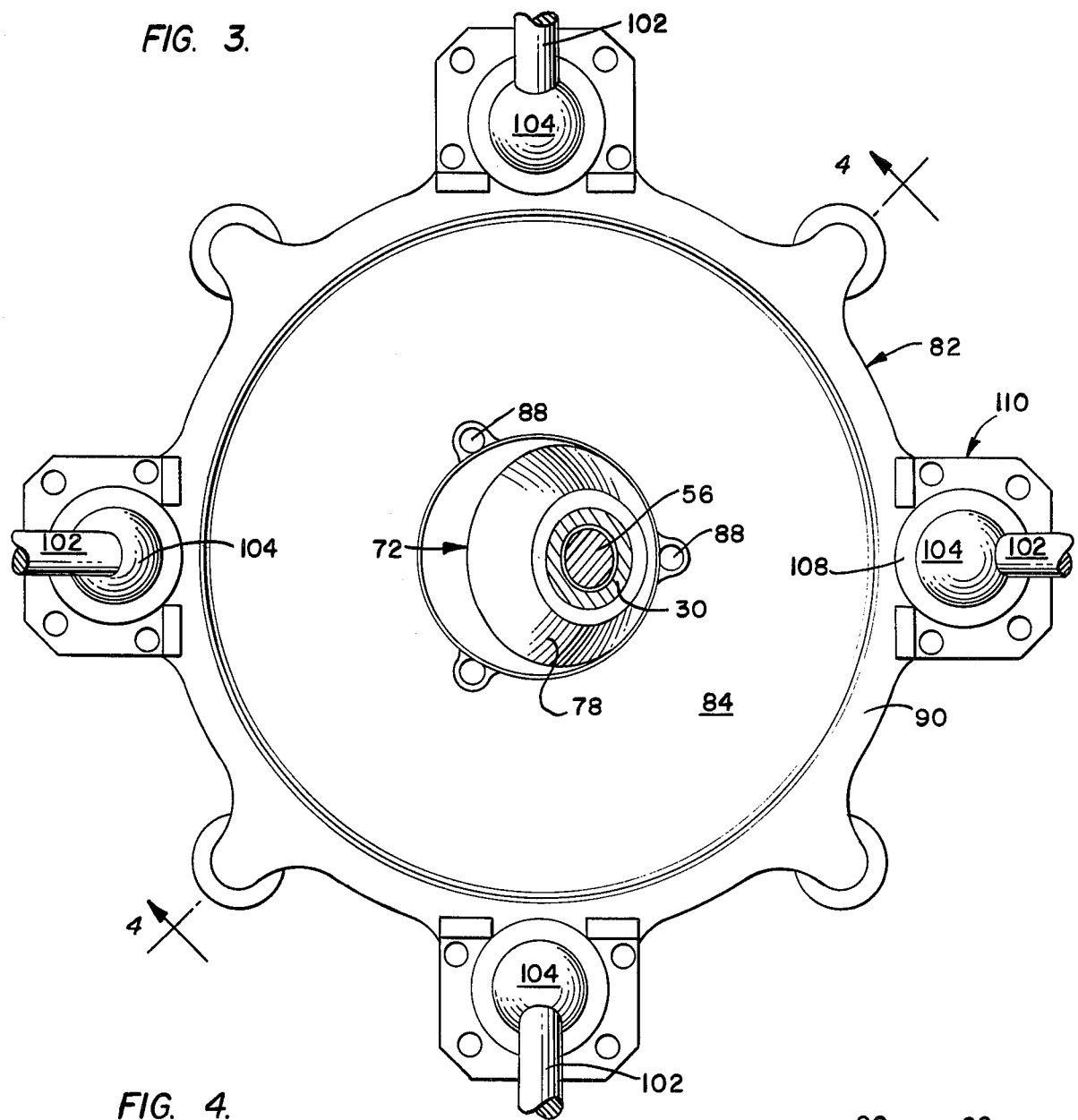
FIG. 3 is a fragmentary cross-section on line 3—3 of FIG. 1.

In FIGS. 1-3 of the drawings, an expansible chamber energy conversion machine incorporating the present invention is embodied in an internal combustion engine of the type which operates in accordance with well known Otto cycle. The engine illustrated is similar to the disclosure of the aforementioned co-pending applications Ser. Nos. 738,704 and 743,600; as such including a frame 10 defining a plurality of cylinders 12 on axes 14 symmetrically disposed in circular fashion about a central engine axis 16. The axes 14 of the cylinders 12 are therefore spaced equidistantly from the axis 16 and in the disclosed embodiment, are parallel to the central axis 16.

Each of the cylinders 12 terminates in an end face 18 in which conventional intake and exhaust valves 20, for example, may be seated and operated between seated or closed and unseated or opened conditions by cams 22 synchronously rotated by an appropriate auxilliary drive train (not shown). Positioned in each cylinder 12 for reciprocation therein along the respective axes 14 is a piston 24 having the usual external ring seals 26 to engage the inner surface of the cylinder 12 in fluid tight relation. In conventional fashion, each of the pistons 24 terminates in an end face 28 defining with the cylinder end face 18 and expansible chamber having a volume which will vary in accordance with the reciprocable stroke distance of piston movement along the axis 14.

A torque transmitting member or hollow shaft 30, in the internal combustion engine illustrated, is supported by the frame 10 through bearings 32 and 34 for rotation on the axis 16. While the bearings 32 and 34 may be of a design different from that illustrated in FIG. 1 of the drawings, for example, it will be noted that the inner race of the bearing 32 and the inner race of the bearing 34 provide for a measure of axial movement of the shaft 30 with respect to the frame 10.

A rotatable support assembly, generally designated by the reference numeral 36, is supported from the frame 10 by bearings 38 and 40 for rotation as a unit about the axis 16. The support assembly 36 includes as separate components, an outer carriage member 42 journalled directly to the frame 10 by the aforementioned bearings 38 and 40 and an inner journal member 44 of generally toroidal configuration in the embodiment shown to fit within a complementing toroidal bore or guideway 46 in the carriage member 42. The journal member 44 is capable of longitudinal movement with respect to the carriage member 44 but is keyed for rotation therewith by appropriate means such as splines 48 (see FIG. 2). The upper end of the rotatable carriage member 42 of the support assembly 46, in the orientation of the engine shown in FIG. 1, is fixed by appropriate means (not shown) to a cylindrical end sleeve 50 supported rotatably between the bearings 34 and 40. The external projecting portion of the sleeve 50 may be provided with gear teeth 52 from which an auxilliary power train (not shown) may be connected for operation of engine auxilliaries including the cams 22 for actuating the valves 20, for example. A torque transmitting disc or plate 54 is keyed between the interior of the tubular extension 50 and a torque transmitting countershaft 56 concentric with and extending through the hollow shaft 30 for rotation also on the axis 16.

The journal member 44 of the support assembly 36 supports a tube-like nutating member 58 having journal and rolling surfaces of revolution 60 and 62, respectively, concentric with each other about an axis 64 intersecting the axis 16 at a point S of axes intersection and inclined with respect thereto at an angle α. The journal surfaces 60 of the tube-like member 58 are supportingly engaged by the journal member 44 of the support assembly 36 through bearings 66 and 68. In light of this organization, it will be seen that rotational movement of the support assembly in the frame 10 about the axis 16, such movement including rotation of the journal member 44 also about the same axis, will effect a nutational movement of the member 58 in which the axis 64 will travel in a biconical path about the axis 16 with the central apex of such path coincident with the point of axes intersection S.

The hollow shaft 30 carries a pair of oppositely convergent cone-like members 70 and 72 on the axis 16 within the tube-like nutating member 58. The cone-like members 70 and 72 are keyed for rotation with but slidable axially on the hollow shaft 30 as a result of longitudinal spline formations 74 and are biased away from each other by a compression spring 76. The cone-like members 70 and 72 are provided with external rolling surfaces of revolution 78 and 80, respectively, about the axis 16 and are slightly curved in axial section by a long meridianal radius of curvature. The configuration of the cone-like members, coupled with the cylindrical inner cylindrical rolling surface 62 of the nutating member 58 and the angular disposition thereof with respect to the axis 16, will cause the compression spring 76 to urge the surfaces 78 and 80 on the cone-like members into frictional contact with the cylindrical rolling surface 62 at two points of contact spaced equally on opposite sides of the point of axes intersection S.

Figure 4:
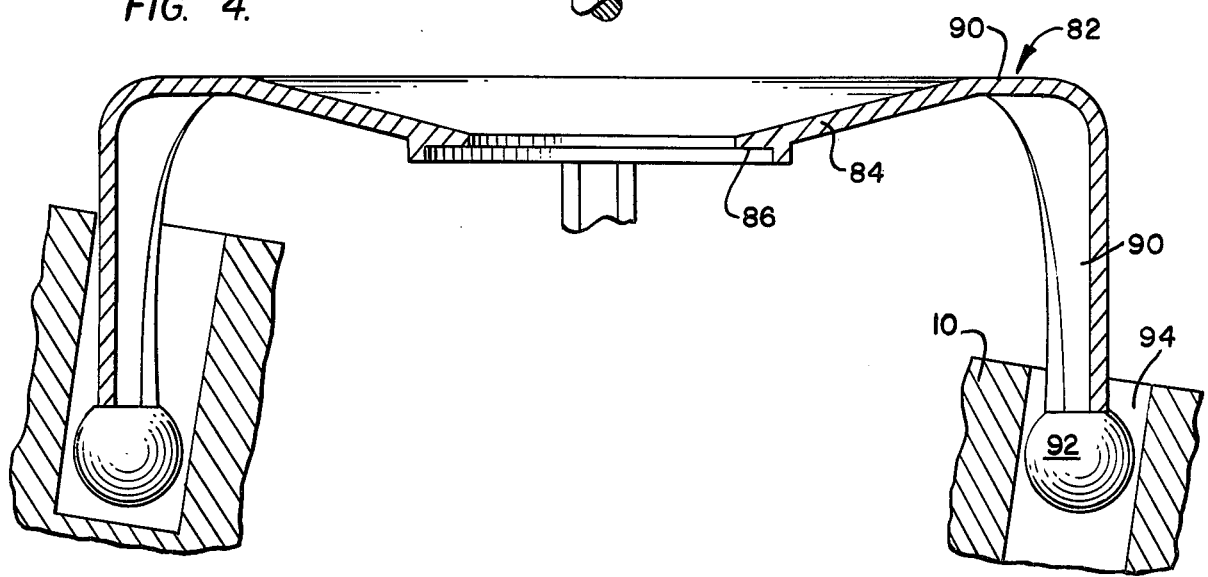
FIG. 4 is a fragmentary cross-section on line 4—4 of FIG. 3.

The tube-like nutating member 58 is connected rigidly at one end, the lower end in the disclosed embodiment, to an outwardly flared spider generally designated by the reference numeral 82, the structure of which is illustrated most clearly in FIGS. 3 and 4 of the drawings. As shown in these figures, the spider 82 is formed with a central frusto-conical portion 84 having a circular seat 86 adapted to be secured against the end of the tube-like nutating member 58 such as by bolts 88. The frusto-conical portion 84 joins outwardly with a circular flange portion 90.

The spider 88 forms part of a linkage assembly by which the pistons 24 are driveably interconnected with the tube-like nutating member 58, such linkage being described in More detail below. It will be noted at this point, however, that the nutating member 58 is blocked or grounded against rotation on the axis 64 by at least one homokinetic joint interconnecting the spider 82 with the frame 10. To this end, the spider is provided with at least one arm-like extension 92 of the circular flange portion 90, four such extensions 90 being provided in the disclosed embodiment, and each supporting at its end a ball 92 receivable in bores 94 in the frame 10. Although the homokinetic joints thus effected between the spider 82 and the frame 10 may take forms different from that illustrated, it will be appreciated that the construction illustrated will prevent rotation of the spider 82 and thus of the nutating member 58 about the axis 64 without interferring with nutational movement thereof as a result of circular movement of the axis 64 about the axis 16.

In the disclosed embodiment, the illustrated engine is provided with four pistons 24, each being driveably connected with the spider 82 and tube-like nutating member 58 by a linkage assembly designated generally by the reference numeral 96. Each of the linkage assemblies is identical and as such includes a piston rod 98, having a ball 100 at one end to effect a swivel connection with a respective piston 24 about a point A, and a swivelling compression link 102 having ball formation 104 joined to the end of the piston rod 98 opposite the ball 100 by a socket portion 108 at a fulcrum point B. The socket portion 108 is provided also with an external spherical surface for engagement by a socket formation carried by a radial tab portion extending outwardly and in the plane of the circular flange 90 on the spider 82. The socket formations 110 carried by the spider 82 are shown most clearly in FIG. 3 of the drawings to include half-sockets bolted to opposite sides of extending tabs on the flange 90. It will be appreciated that in light of this organization, the ball 104, the socket 108 of the piston rod 98 and the socket 110 of the spider 82 will be joined for relative swivelling movement about the common fulcrum point B. Also, this organization is repeated for such cylinder or each piston 24, the corresponding fulcrum points for the other pistons being illustrated by primed reference letters A' and B'.

In accordance with the present invention, the end of each compression link 102 opposite the ball 104 is supported by a carriage member 112 through a compound fulcrum swivel 113 having mutually perpendicular axes C and D offset by a distance e on a line F intersecting the axis C, bisecting the arc traversed by the axis D and also intersecting the point S of first and second axes intersection. Although the construction and operation of the compound fulcrum swivel 113 as well as the adjusting path of the carriage member 112 will be described in more detail below with respect to FIGS. 6–9 of the drawings, it will be noted from FIG. 1 that each carriage member 112 is supported for sliding movement along a frame carried guide track 114 in the disclosed embodiment by a hydraulic system including rams 116 preferrably supported from the frame by trunnions 117 on an axis parallel to the fulcrum axis C. In order that adjustable movement of the carriages 112 along the tracks 114 result in movement of the fulcrum axes C and C' through equal distances for all pistons, the rams 116 associated with the linkage assembly 96 for each piston are connected by conduits 118 to a control unit exemplified by the illustration in FIG. 5 of the drawings. In particular, it will be noted that each of the conduits 118 communicates with a separate hydraulic chamber 120 and 120' supplied with hydraulic fluid from a sump 122. Each cylinder or chamber 120 and 120' is provided with an actuating piston 124 and 124' adapted to be moved by a common actuator 126 from a retracted position below a shunt conduit 126 upwardly to deliver hydraulic fluid to the rams 116 and advance the carriages 112 upwardly along the guide tracks 114. The actuator may be operated by an appropriate control 128 such as that shown schematically in FIG. 5 of the drawings. As a result of this organization, retraction of the pistons 124 and 124' below the shunt line 125 will insure an equal amount of hydraulic fluid in each of the chambers 120 and 120' and correspondingly identical adjustable positioning movement of the socket members 112 along the guide tracks 114.

Figure 5:
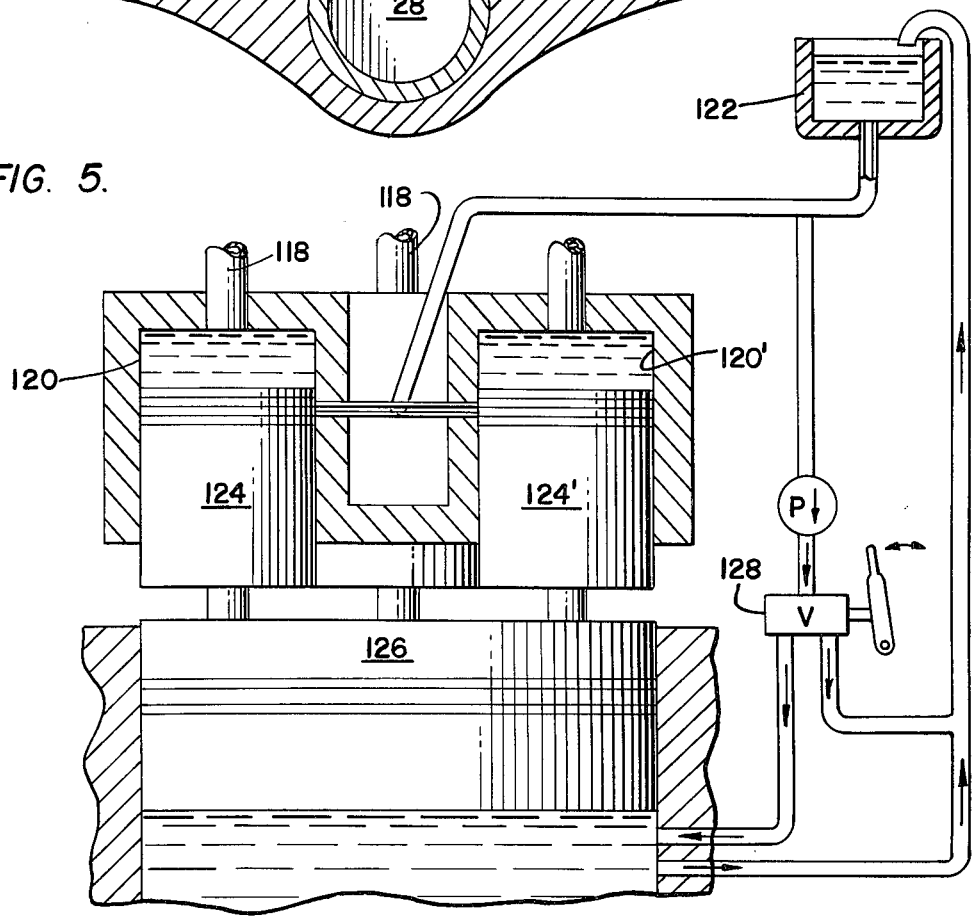
FIG. 5 is a fragmentary cross-section and schematic view illustrating a control for the engine of FIG. 1.

It will be appreciated that the control organization illustrated in FIG. 5 will adjust the fulcrum axis C for each of the links 102 associated with each of the four pistons 24 in the disclosed engine synchronously in a path determined by the guide tracks 114. The effect of such adjustment on the stroke distance and locus of piston reciprocation may be understood by reference to FIG. 8 of the drawings in which the various components of two linkage assemblies 96 are depicted in line form and in relation to the axes 14, 16 and 64. Also in FIG. 8, the previously identified fulcrum points A and B and fulcrum axis C are repeated with subscripts 1, 2 and 3 representing each of the three positions of adjustment. In addition, the intersection of the axis 64 with the effective plane of the spider 82 is designated by the reference letter G.

Figure 8:
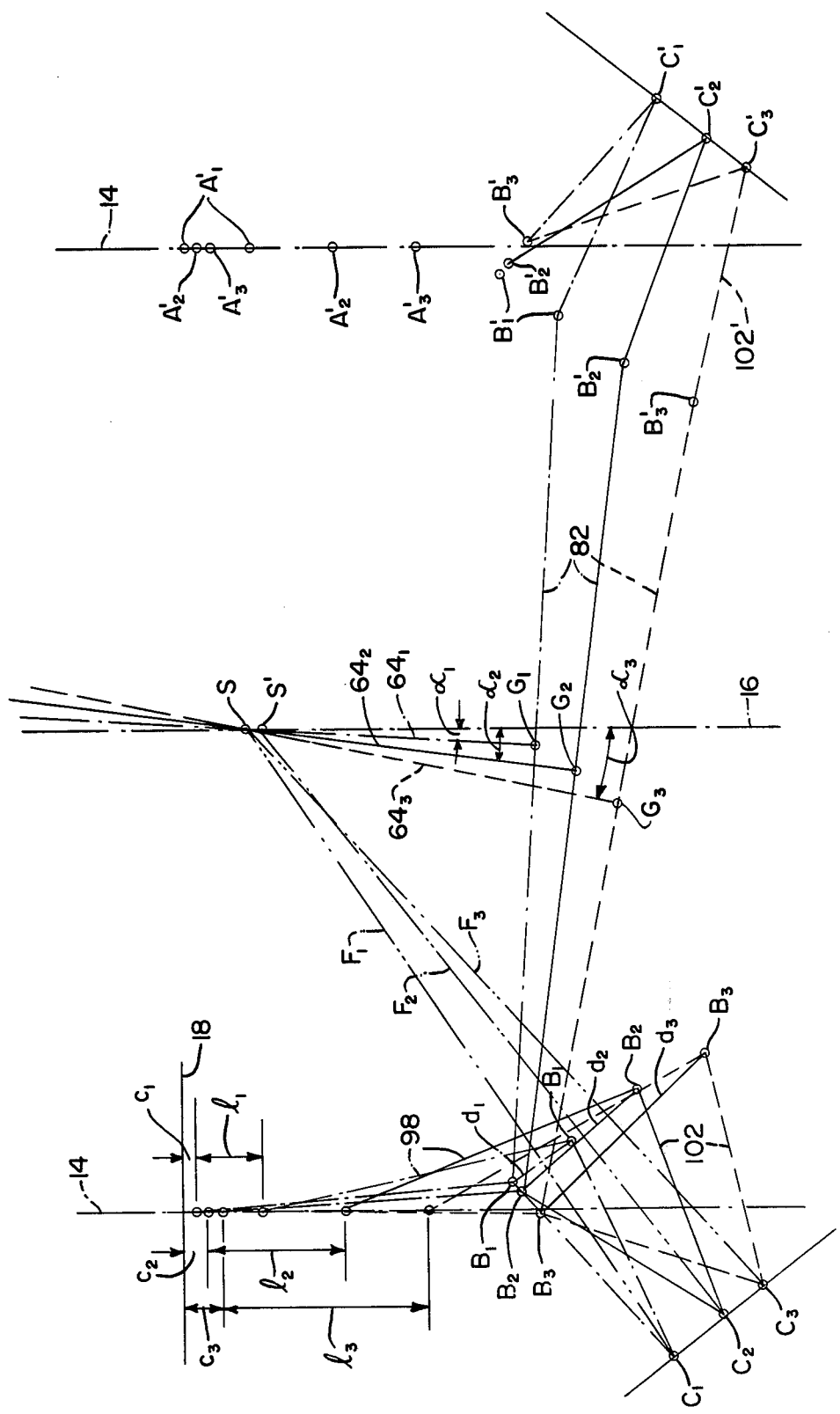
FIG. 8 is a schematic diagram depicting the geometry of linkage incorporated in the engine shown in FIG. 1.

As shown in both FIGS. 1 and FIG. 8, the guide tracks 114 are inclined with respect to the axis 16 so that movement of the fulcrum axis C by the rams 116 may be resolved into a directional component parallel with the axis 16 and a directional component traverse to that axis. The directional component parallel with the axis 16 will, as a result of the connection of the swivel links 102 with the spider 82, effect an axial shifting of the tube-like nutating member 58 and the journal member 44 of the support assembly in an arcuate path established by the toroidal bore 46 in the carrier 42. As a result of such arcuate movement, the angle $\alpha$ between the axes 64 and 16 will vary. In light of the disclosed structural organization, moreover, this variation in the angle $\alpha$ will be correlated directly with positional adjustment of the fulcrum axis C along the guide track 114.

The effect of changing the angle $\alpha$ is that the radius or throw of the circular path defined by the point G upon nutating movement of the member 58 will vary directly with the angle $\alpha$. Similarly and because of the connection of the nutating member through the spider 82 with the swivel links at the fulcrum point B, fulcrum point B will travel in a path concentric with the line F intersecting the fulcrum point C and the point S of axes intersection, the planes of such paths being represented in FIG. 8 by the lines $d_1$, $d_2$ and $d_3$. The direct connection of the piston rods 98 to the fulcrum point B, coupled with the inclination of the plane of the circular paths $d_1$, $d_2$ and $d_3$ will result in a variable stroke distance $l_1$, $l_2$ and $l_3$ through which the fulcrum point A and the pistons 24 are moved. In addition, it will be noted that the clearance distance represented by $c_1$, $c_2$ and $c_3$ vary in proportion with the stroke distance $l$ in a manner to effect an essentially constant compression ratio in spite of variations in the piston stroke distance length and the fixed relation of the cylinder end faces 18 defining with each piston, the respective expansion or combustion chambers.

Because of the manner in which the angle $\alpha$ is changed by adjustable relocation of the fulcrum axis to positions C1, C2 and C3, the point of axes intersection S may shift slightly along the axis 16. This shifting of the point S, however, will have no effect of the symmetry of the cone-like members 70 and 72 with respect to the point S because of the equal and opposite sliding movement of the cones along the axis 16 until the outer rolling surfaces 78 and 80 thereon engage the rolling surface 62 of the nutating member 58.

Although the path through which the fulcrum C is moved along the guide tracks 114 is depicted in FIG. 8 as a straight line, the precise configuration of this path in practice may be a straight line, an arc, or other curved configuration. The precise movement of the fulcrum axis C required to achieve an overall dynamic balance in a given design is first determined by such parameters as the radius of the torous guideway, the length of the piston rods 98 and compression links 102, the distance between the points B and B' as established by the dimensions of the spider 82 the distance between the fulcrum axis C and the cylinder end face 18 and ultimately, the position at which the path taken by the fulcrum point B at each angle $\alpha_1$, $\alpha_2$ and $\alpha_3$ is concentric with the line F extending from the fulcrum axis C to the point of axes intersection S for a given piston operating characteristics in terms of stroke distance and locus of reciprocation relative to the cylinder end faces 18.

The analysis of machine geometry thus described with reference to FIG. 8 of the drawings is an accurate characterization of point and axis movement for the three positions of adjustment depicted in FIG. 8, but only in the plane of this figure. Actual movement of points associated with the nutating member 58 in a spherical frame of reference, however, imposes an additional requirement in the linkage assembly 96 and in particular, the specific path of the point B in the respective planes $d$. An understanding of this phenomenon may be appreciated by reference to FIG. 9 of the drawings.

Figure 9:
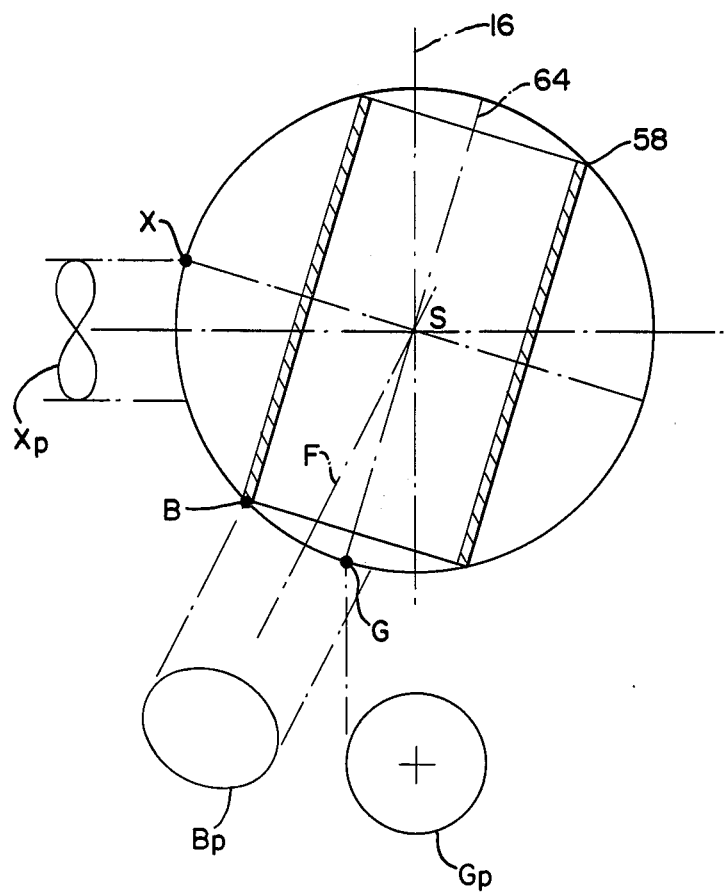
FIG. 9 is a schematic diagram depicting the paths of travel of various points on a cylindrical nutating member incorporated in the invention.

In FIG. 9, the nutating member 58 is illustrated with the nutating axis 64 thereof intersecting the axis 16 at the point S, all as previously described. Also illustrated are the points B and G in their approximate positions on the nutating member 58 as well as a point X located at the intersection of a line perpendicular to the axis 64 and a circle representing a sphere of nutating member movement. Because the nutating member is prevented from rotation or other angular movement about the axis 64 as a result of the grounding joints described above with respect to FIGS. 3 and 4 of the drawings, the path followed by the point G in a plane perpendicular to the axis 16 will be a truly circular path as depicted by the reference letter $G_p$ in FIG. 9. The path of movement of the point X in a plane parallel to the axis 16 is similarly depicted by a curve $X_p$ which as shown, is in the nature of the figure "eight". The path of the point B in a plane perpenducular to the line F or in any of the planes $d$ described above with respect to FIG. 8, is an elipse having a major diameter in the plane of FIG. 8, for example, and a minor diameter perpendicular to that plane.

It should be noted that although the paths $X_p$ and $B_p$ are characterized as "planes", it is recognized that the intersection of a plane with a sphere will define only a true circle. Therefore, the use of the word "plane" in the preceding discussion and hereafter is intended as a "median plane" which lies on the reference sphere midway between variations in radial distance of points lying on the paths $X_p$ and $G_p$ from the point S.

Figure 6:
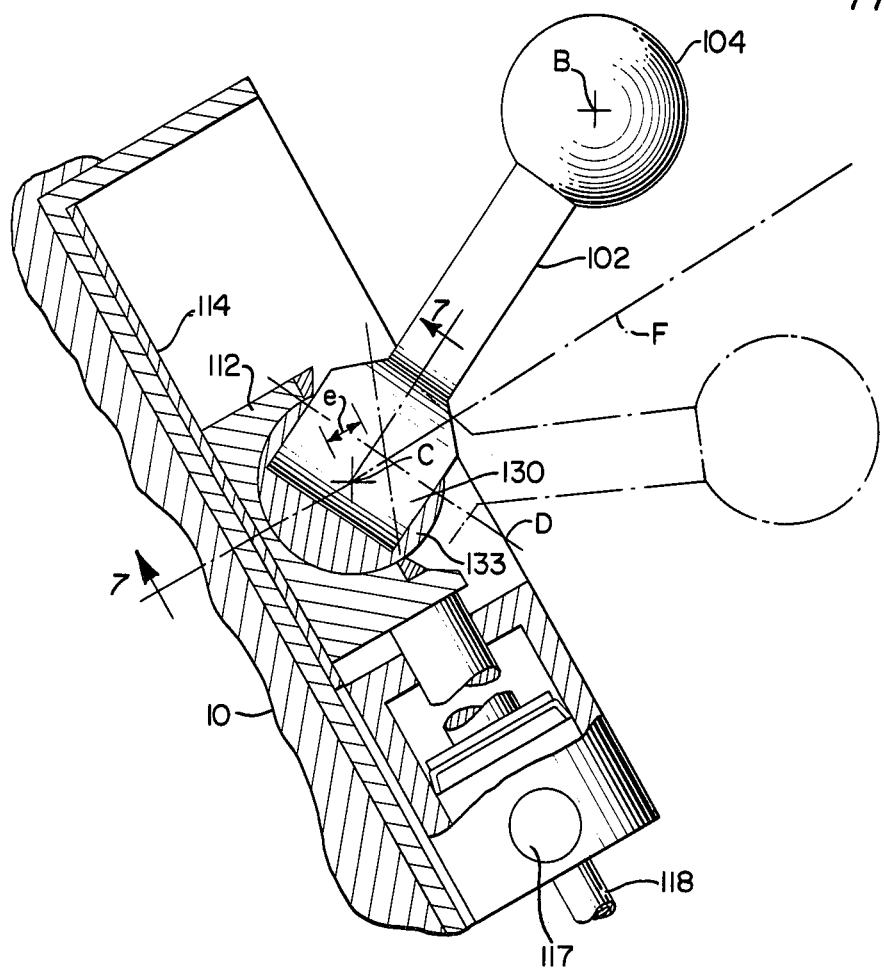
FIG. 6 is an enlarged side elevation, in partial section, illustrating details of the support for each of four swivel links used in the embodiment illustrated in FIG. 1.
Figure 7:
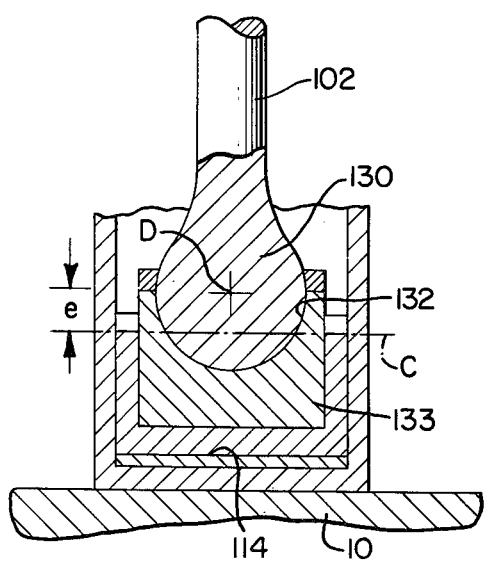
FIG. 7 is a fragmentary cross-section taken on line 7—7 of FIG. 6.

To facilitate the real path through which the fulcrum point B must move, therefore, the compound swivel fulcrum 113 or its equivalent is required in each of the linkages at 96. Thus, as shown in FIGS. 6 and 7 of the drawings, each of the links 102 extends from the ball 104 to a cylindrical end portion or trunnion 130 seated in a cylindrical or semi-cylindrical bearing surface 132 for rotation about the axis D. The bearing surface 132 is formed in a separate cylindrical member or trunnion 133 journalled in the carriage member 112 for pivotal movement about the fulcrum axis C.

It will be noted that the axis D is perpendicular to the minor axis of the eliptical path travelled by the point B whereas the axis C is perpendicular to the major axis of that eliptical path. As a result, the arc radius of the point B about the axis C is longer by the distance $e$ than the arc radius of the point B about the axis D. Thus, the point B may follow precisely the eliptical path $B_p$ by an appropriate selection of the offset distance $e$ along the line F which is concentric with the eliptical path and intersects the point S of first and second axes intersection.

In the operation of the engine, synchronized reciprocation of the pistons 24 will operate through the described linkage assemblies 96 and spider 82 to drive the tube-like nutatable member 58 such that the axis 64 will travel in a biconical path about the axis 16. The transmission of torque from the nutating member to an engine output shaft 134 is described fully in the aforementioned co-pending application Ser. No. 743,600 filed Nov. 22, 1976 by Yves Jean Kemper and assigned in common with the present invention. This co-pending application is therefore expressly incorporated herein by reference and accordingly, only a summary of the transmission of torque from the nutating member 58 to the output shaft 134 will be given below.

Nutation of the member 58 is transmitted as rotational torque to the support assembly 36 through the journal member 44 and the carrier 42 to the counter shaft 56. Simultaneously, such nutational movement of the member 58 is transmitted to the hollow shaft 30 by frictional engagement of the cone-like members 70 and 72 with the surface 62 of the nutating member. Because the ratio of contact radii of the surfaces 78 and 80 on the cone-like members and the radius of the rolling surface 62 will vary, rotational speed of the shaft 30 will vary with changes of the angle $\alpha$. Torque transmitted by both the shafts 30 and 56 is transmitted to the output shaft 134 through an epicyclic gear train 136 having respective sun, planet and ring gears 138, 140 and 142. As shown in FIG. 1, the sun 138 is keyed for rotation with the counter shaft 56 whereas the ring gear 146 is keyed to the hollow shaft 30. The output shaft 134 is keyed to the planet carrier. As a result of this organization, coupled with the interconnection of the pistons 24 to the nutating member 58, the speed of the shaft 134 will be varied in accordance with piston stroke length or engine displacement in a manner to optimize engine operating parameters.

The structural organization and geometry of the expansible chamber energy conversion machine thus described, particularly when adapted to an Otto-cycle internal combustion engine, possesses several desirable characteristics which will be appreciated by those skilled in the art. For example, dynamic balance of rotatable and nutatable members, the latter including the swivel links 102 which absorb the thrust of piston force, is achieved as a result of a convergence of all nutating and rotational axes on the point S. This condition occurs for all positions of the carriage members 112 as a result of the design configuration of the guide tracks 114. Transmission of piston thrust to the nutating member 58 by way of the spider 82 results solely in tensile torque and compressive loading of the spider, a type of loading for which the spider structure is particularly well suited.

It will be noted also from the illustration in FIG. 8 of the drawings, that when the angle $\alpha$ is adjusted to its maximum value to achieve a maximum piston stroke length $l_3$, the axis of the link 102' becomes esssentially aligned with the effective plane of the spider 82 and the point $B_3$ at the extreme end positions of piston reciprocation. As a result of this characteristic, all forces acting at the point $B_3$ are in essentially complete equilibrium and resolved exclusively in the frame 10. While this same condition of equilibrium diminishes somewhat as the piston stroke length is reduced, the forces transmitted by the linkages 96 are reduced as a result of reduced power development at shorter piston stroke lengths. In other words, the condition of dynamic balance is enhanced as power generation of the internal combustion engine is increased.

Another characteristic of the illustrated embodiment is that while compression ratio is close to constant for all piston stroke lengths, there is a tendency for the compression ratio to increase with shorter piston stroke lengths. This characteristic is consistent with optimum fuel ignition characteristics since such factors as leakage of compressed gases about the piston and heat absorption by the cooling system of the engine remains essentially constant for all piston stroke lengths. Since a smaller volume of gas is contained in the combustion chamber with a short piston stroke, a slightly increased compression ratio can be tolerated without creating pre-ignition or detonation of a fuel having a given octane rating.

The facility for adjusting piston stroke length using a single static control is also an important advantage of the present invention. In particular, the avoidance of a need for running seals enables the use of a relatively simple hydraulic system of the type illustrated in FIG. 5 of the drawings. It is contemplated, moreover, that equivalent mechanical control systems may be employed.

It is to be noted also that the use of the toroid configuration for supporting the journal member 44 and nutating member 58 is merely exemplary of other satisfactory means for achieving adjustability in the nutational angle α using the static control system described. Although the toroidal shape of the bore or guideway 46 is continuous throughout the length of the carrier 42 in the disclosed embodiment, it will be seen that the central portion might be omitted, in which case, the sliding surfaces on the journal member 44 and the carriage member 46 function as complementing and oppositely inclined ramp surfaces effective at opposite ends of the nutating member 58. While such ramp surfaces are arcuate by virtue of the toroidal shape shown, it is contemplated that adjustable movement of the nutating member may be accomplished by supporting the bearings 66 and 68 in oppositely inclined but truly linear or cylindrical bores formed in opposite ends of the carrier 42. It is important only that the angular adjustment of the nutating member be effected by an adjustment of the fulcrum axis C from which each swivel link 102 is supported.

Thus it will be seen that as a result of the present invention an improved expansible chamber energy conversion machine is provided and by which the above-mentioned objectives are completely fulfilled. Since it will be apparent to those skilled in the art that various modifications and/or changes may be made in the embodiment illustrated and described herein without departure from the inventive concepts manifested thereby, it is expressly intended that the foregoing description is illustrative of a preferred embodiment only, not limiting, and that the true spirit and scope of the present invention be determined by reference to the appended claims.

We claim:

1. In an expansible chamber energy conversion machine having a frame, a torque transmitting member supported by the frame for rotation about a first axis, a nutatable member having journal surfaces concentric with a second axis intersecting the first axis at an angle to establish a point of axes intersection, support means rotatable on the first axis and rotatably supporting the nutatable member for movement of the second axis in a biconical path about the first axis with the apex of the biconical path coincident with the point of axes intersection, a piston reciprocable on a third axis through a stroke distance in a working fluid chamber having an end face fixed relative to the frame and a linkage assembly having a swivelling compression link for interconnecting the piston with the nutating member, one end of the link being swivelled on the frame and the other end thereof being swivelled with the nutating member for movement in a path perpendicular to and symmetric about a line passing through the point of axes intersection, the improvement comprising:
   journal means carried by the support means to rotatably engage the journal surfaces on the nutating member;
   means for changing the angle of first and second axes intersection upon axial movement of said journal means relative to the support means, said angle changing means including complementing and oppositely inclined ramp surfaces effective at the respective opposite ends of the nutating member, said ramp surfaces being formed on the support means and said journal means respectively; and
   adjustable means to support the end of the swivel link swivelled on the frame for movement in a direction to shift the nutating member axially of the support member and frame, thereby to change the nutational throw of the nutatable member and the stroke distance of the piston.

2. The apparatus recited in claim 1, wherein said inclined ramp surfaces are arcuate.

3. The apparatus recited in claim 2 wherein said arcuate ramp surfaces are defined by exterior and interior toroidal surfaces on said journal means and the support means respectively.

4. The apparatus recited in claim 1 including means to control relative rotation of said journal means and the support means.

5. The apparatus recited in claim 4 wherein said journal means and the support means are keyed for rotation with each other.

6. The apparatus recited in claim 5 wherein said means to support the one end of the link comprises a carriage and means defining a guide track on the frame to support said carriage adjustably on said guide track.

7. The apparatus recited in claim 6 wherein movement of said adjustable swivel link end is in a direction to shift said nutatable member along the first axis and including means to vary the angle of the first and second axes intersection to adjust the throw of the nutatable member and the stroke distance of the pistons.

8. An expansible chamber energy conversion machine comprising:
   a frame;
   a torque transmitting member supported by said frame for rotation about a first axis;
   a nutatable member having concentric journal and rolling surfaces of revolution about a second axis intersecting said first axis at an angle to establish a point of axes intersection;
   support means rotatable on said first axis and having journal means rotatably engaged with said journal surfaces to support said nutating member for movement of said second axis in a biconical path about said first axis the central apex of said biconical path being coincident with said point of axes intersection, said journal means carrying said nutating member for combined axial and angular movement with respect to said first axis;

means carried by said torque transmitting member to define rolling surfaces of revolution about said first axis, one such rolling surface on each side of a plane perpendicular to said first axis at said point of axes intersection, said rolling surfaces of revolution about said first axis being in torque transmitting engagement with said rolling surfaces of revolution on said nutating member at two points of contact spaced equidistantly on opposite sides of said point of axis intersection and lying in a plane containing said first and second axes;

means including a piston defining a working fluid chamber on said frame, said piston being reciprocable on a third axis through a stroke distance to establish relatively large and small chamber volumes, said chamber having an end face fixed relative to said frame and spaced from said piston by a clearance distance when said piston is positioned to establish said small chamber volume;

means interconnecting said piston with said nutating member and including a swivelling compression link having one end swivelled on said frame and the other end swivelled with said nutating member for movement in a planar path perpendicular to and symmetric about a line passing through said point of axes intersection, the distance of said path from said line being proportional to the length of said piston stroke distance; and static control means for shifting said one end of said link and for shifting nutating member to vary the angle of said first and second axes intersection, and the locus of piston reciprocation relative to said end face.

9. The apparatus recited in claim 8 wherein said support means includes a carrier member rotatable on said first axis, said carrier member and said journal means being rotatably coupled and movable relative to each other in the direction of said first axis, said carrier member and said journal member having complementing and oppositely inclined ramp surfaces effective at least on opposite ends thereof.

10. The apparatus recited in claim 9 wherein said inclined ramp surfaces are defined by interior and exterior toroidal guide surfaces on said carrier member and said journal means respectively.

11. The apparatus recited in claim 8 including a plurality of said pistons symmetrically positioned about said first axis and, one said swivelling compression link being provided for each piston, and wherein said interconnecting means further comprises rigid means carried at one end of said nutatable member and connected for swivel movement with the other end each of said compression links.

12. The apparatus recited in claim 11 including a piston rod extending between each piston and the other end of the respective swivel links for each piston, each said piston rod having swivel joint means at opposite ends, one such swivel joint means being connected with the other end of said swivel link at a common fulcrum point therewith.

13. The apparatus recited in claim 8 including means for combining torque transmitted by said nutating member to said support means and said torque transmitting member.

14. In an expansible chamber energy conversion machine having a frame, a torque transmitting member supported by the frame for rotation about a first axis, a nutatable member having journal surfaces concentric with a second axis intersecting the first axis at an angle to establish a point of axes intersection, support means rotatable on the first axis and rotatably supporting the nutatable member for movement of the second axis in a biconical path about the first axis with the apex of the biconical path coincident with the point of axes intersection, plural pistons each reciprocable on a respective third axis through a stroke distance in a working fluid chamber having an end face fixed relative to the frame, said pistons connected by respective linkage assemblies, each such assembly having a swivelling compression link for interconnecting the pistons with the nutating member, one end of the link being swivelled on the frame and the other end thereof being swivelled with the nutating member for movement in a path perpendicular to and symmetric about a line passing through the point of axes intersection, the improvement comprising:

journal means carried by the support means to rotatably engage the journal surfaces on the nutating member;

means for changing the angle of first and second axes intersection upon axial movement of said journal means relative to the support means;

adjustable means to support the end of the swivel link swivelled on the frame for movement in a direction to shift the nutating member axially of the support member and frame, thereby to change the nutational throw of the nutatable member and the stroke distance of the piston;

compound fulcrum means to swivel said other end of each said swivel and carriage means to support said compound fulcrum means on the frame, said compound fulcrum means defining mutually perpendicular fulcrum axes offset from each other on a line passing through the point of first and second axes intersection and the fulcrum axis positioned most remotely from said point of axes intersection; and each of said linkage assemblies having static control means for moving the one end of all compression links simultaneously through the same distance.

* * * * *